May 15, 1934.　　　　S. PETERSON　　　　1,959,140

TOOL HOLDER

Filed Dec. 21, 1932

WITNESSES:
William E. Simpson
D. J. Hyson

INVENTOR:
Samuel Peterson

Patented May 15, 1934

1,959,140

UNITED STATES PATENT OFFICE 1,959,140

TOOL HOLDER

Samuel Peterson, Detroit, Mich.

Application December 21, 1932, Serial No. 648,266

7 Claims. (Cl. 82—35)

My invention relates to tool holders and its principal object is to provide a tool holder for use with automatic screw machines of the multiple-spindle type by the use of which the articles produced may be maintained accurately within the required tolerances and at the same time free from chatter marks and other defects over long periods without adjustment of the tools.

In tool holders of the type at present employed for this purpose it is found that, notwithstanding the employment of steady-rests, rollers, and other devices, a considerable portion of the work produced is rejected, this being due to the fact that it is practically impossible to maintain the various spindles in alignment with one another, that is to say, at exactly the same distance from their common axis of rotation.

According to the present invention I have provided a tool holder which includes a tool and an adjustable work guide combined in a unitary structure held in position by resilient means in such manner that the tool and the guide may float back and forth through a limited range of movement and thereby compensate for any misalignment of the individual spindles.

A further object of my said invention is to provide a tool holder of the kind referred to in which the parts are made interchangeable to such an extent as to be applicable to a great variety of different jobs.

With these and other objects in view the invention consists in the improved construction, arrangement, and combination of parts which will be hereinafter fully described, reference being had to the accompanying drawing, which illustrates a preferred embodiment thereof, in which drawing—

Similar characters designate corresponding parts throughout the several views.

Figure 1:
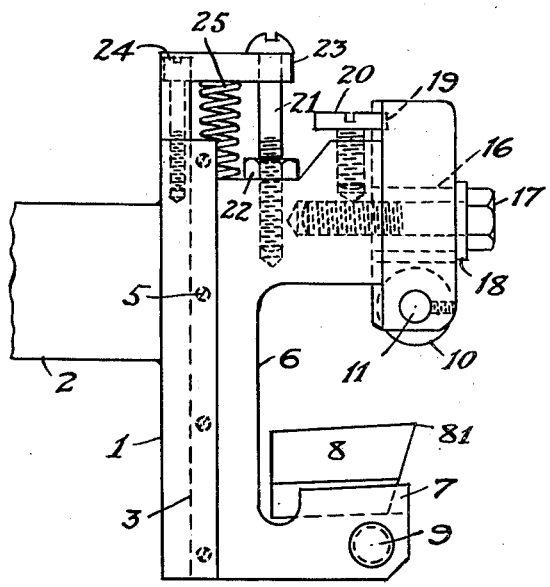
Figure 1 is a side elevation of a tool holder constructed in accordance with my invention.

1 is the body of the tool holder provided with the usual shank 2 the size and shape of which is adapted to fit the particular type of screw machine with which it is to be employed. In the body 1 is the dove-tailed guide-way 3 provided with the gib 4 and adjusting screws 5, and in this guide-way is mounted the frame 6 having at its lower end the dove-tailed jaws 7 adapted to receive the tool or cutter 8 which is clamped therein by one or more screws 9, as well known in the art.

Figure 2:
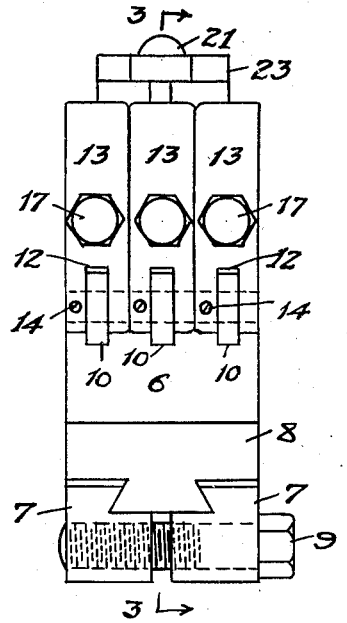
Figure 2 is a front elevation of the same.
Figure 3:
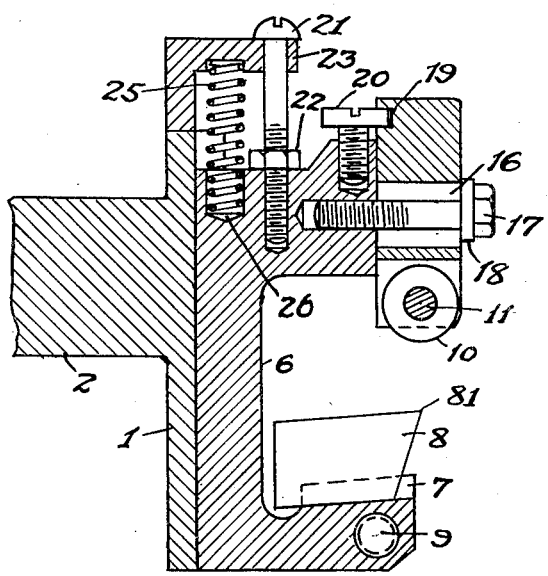
Figure 3 is a section on line 3—3 of Figure 2.
Figure 4:
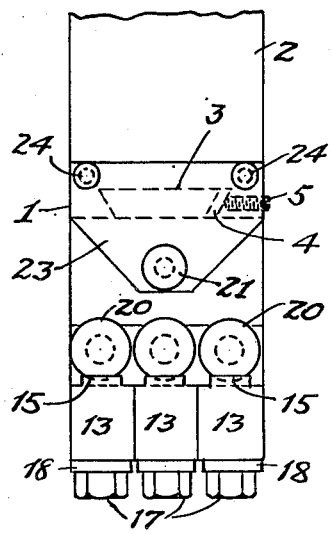
Figure 4 is a plan view.

Upon the upper part of the frame 6 are carried the guide rollers 10 rotatable on pins 11, the axes of which are substantially in alignment with the cutting edge 81 of the tool 8. These guide rollers, as shown more clearly in Figure 2, are located in slots 12 formed in the blocks 13, the individual pins 11 being secured in position and prevented from rotating by the screws 14. Each of the blocks 13 is slidably mounted in a groove 15 in the frame and is slotted at 16 to receive the binding screw 17 which co-operates with the washer 18 to clamp the block in position. In the rear edge of each of the blocks is a transverse groove 19 in which engages the enlarged head of a screw 20 upon the frame by the rotation of which the block with its roller may be adjusted vertically so as to vary the distance between the roller and the cutting edge of the tool, the binding screw 17 being loosened during the adjusting process, as will be understood.

Movement of the frame 6 relative to the body 1 is limited in the downward direction by the screw 21, the said screw being adjustable in the frame and locked in any desired position by the nut 22, the head of the said screw engaging the upper surface of a bracket 23 fixed to the body 1 by screws 24, and rearward of the screw 21 is the helical compression spring 25, the lower part of which is seated in a hole 26 in the frame while the upper part reacts against the underside of the bracket 23.

It will be understood from the foregoing description that when the guide rollers are set at the proper distance from the cutting edge of the tool, according to the diameter of the work, the frame 6 is capable of floating up and down in the guideway 3 to a distance which is determined by the setting of the screw 21, and so adjusting itself to any irregularity or eccentricity of the work, thus avoiding the trouble and waste of material due to the causes hereinbefore outlined. It will be noted that the upper surface of the cutter 8 is inclined. Due to this inclination of the upper surface and due to the fact that the work rests upon the cutter, it is obvious that the tool will clear itself when it passes over the center of the work piece. Consequently when the shaving of the work piece by the cutter is completed and the cutter passes over the center of the rotating work piece, the frictional contact with the work piece will cease.

While I have hereinbefore described and shown a preferred embodiment of my invention as applied to a multiple-spindle screw machine, it will be readily understood by those skilled in the art that the same may be modified in various ways to meet any particular or peculiar requirement, without departing from the spirit of my invention. For example, while I have shown my improved holder as having three guide rollers, the number of the same may be varied, although it is preferable in most cases to have at least two such rollers. Also, while I have herein shown for the purpose of illustration a straight shaving tool, obviously my improved holder may be adapted to receive tools of various other forms.

Having thus described my said invention, what I claim and desire to secure by Letters Patent of the United States is:

1. In a tool holder of the class described, a supporting body; a supporting frame slidably mounted on said body; a cutting tool mounted on said frame adjacent one side thereof; and a plurality of spaced work-engaging rollers on said frame positioned opposite said cutting tool, having their axes in alignment with the cutting edge of the tool, the work-piece engaging face of said tool being inclined, said rollers being independently movable toward and away from said face of said tool.

2. In a tool holder of the class described, a supporting body; a supporting frame slidably mounted on said body; a cutting tool mounted on said frame adjacent the lower side thereof; a plurality of spaced work-engaging rollers on said frame positioned above said cutting tool having their axes in alignment with the cutting edge of the tool, the upper face of said tool being inclined; and means for moving each of said rollers individually toward and away from said cutting tool.

3. A device of the class described comprising: a supporting body; a frame mounted on said supporting body; a cutting tool carried by said frame; a plurality of blocks slidably mounted on said frame; a roller mounted on the lower end of each of said blocks and positioned above the cutting tool; a screw for moving each of said blocks individually toward and away from said cutting tool; and means threaded into said frame for locking each of said blocks individually against movement relatively to said cutting tool.

4. In a device of the class described, a frame; a cutting tool mounted on said frame; a plurality of blocks slidably mounted on said frame, each of said blocks having a groove formed therein; a plurality of screws threaded into said frame; a projection on each of said screws engaging in said groove and effective upon the screwing of said screws into and out of said frame for moving said blocks individually toward and away from said cutting tool; and a work piece engaging roller carried on each of said blocks adjacent the lower end thereof.

5. A device of the class described comprising: a supporting body; a frame slidably mounted on said body; a cutting tool mounted on the lower end of said frame; a bracket on said body overlying said frame; a spring engaging at one end said frame and at the opposite end said bracket for normally tending to move said frame downwardly relatively to said bracket; a screw projected through said bracket and threaded into said frame for limiting the downward movement of said frame relatively to said bracket without interferring with the upward movement of said frame relatively to said bracket.

6. In a tool holder of the class described, a supporting body; a supporting frame slidably mounted on said body; a cuting tool mounted on said frame adjacent one end thereof, a plurality of roller bearing members slidably mounted on said frame opposite said cuting tool, each of said roller bearing members being movable independently of the other; a roller carried by each of said roller bearing members adapted for engaging a workpiece engaged by said cutting tool; and means for locking said roller bearing members against slidable movement.

7. In a tool holder of the class described, a supporting body; a supporting frame slidably mounted on said body; a cutting tool mounted on said frame adjacent one end thereof; a work-piece engaging roller on said frame positioned opposite said cutting tool, the cutting edge of said tool being on the side positioned outwardly from said frame and the work-piece engaging face of said tool being inclined inwardly therefrom so that the thickness of said cutting tool diminishes proceeding inwardly of the cutting edge.

SAMUEL PETERSON.